(12) United States Patent
Dotson

(10) Patent No.: US 6,233,863 B1
(45) Date of Patent: May 22, 2001

(54) FISHING LURE AND KIT

(76) Inventor: Allen Ray Dotson, P.O. Box 1847, Bullhead City, AZ (US) 86442

( * ) Notice: Subject to any disclaimer, the term of this patent is extended or adjusted under 35 U.S.C. 154(b) by 0 days.

(21) Appl. No.: 09/344,270

(22) Filed: Jun. 30, 1999

(51) Int. Cl.[7] .................................................. A01K 85/00
(52) U.S. Cl. ...................... 43/42.09; 43/42.28; 43/42.38; 43/42.39
(58) Field of Search ................................ 43/42.09, 42.1, 43/42.24, 42.25, 42.28, 42.37, 42.38, 42.39

(56) References Cited

U.S. PATENT DOCUMENTS

| | | | |
|---|---|---|---|
| 2,538,052 | * | 1/1951 | Scwarzer ............................ 43/42.28 |
| 2,618,094 | * | 11/1952 | Shindler ............................. 43/42.24 |
| 3,046,689 | * | 7/1962 | Woodley ............................ 43/42.24 |
| 4,530,180 | * | 7/1985 | Gwaldacz, Sr. et al. ........... 43/42.28 |
| 4,819,366 | * | 4/1989 | Manno ................................ 43/42.39 |
| 4,899,483 | * | 2/1990 | Pippert ................................ 43/42.39 |
| 5,134,801 | * | 8/1992 | Davey ................................. 43/42.28 |
| 5,245,783 | * | 9/1993 | Cumiskey ........................... 43/42.37 |
| 5,428,918 | * | 7/1995 | Garrison ............................. 43/42.28 |
| 5,499,471 | * | 3/1996 | Foutch et al. ...................... 43/42.38 |
| 5,630,289 | * | 5/1997 | Dotson ............................... 43/42.09 |
| 5,899,015 | * | 5/1999 | Link ................................... 43/42.39 |

* cited by examiner

Primary Examiner—Darren W. Ark
(74) Attorney, Agent, or Firm—Philip J. Anderson; Anderson & Morishita

(57) ABSTRACT

A fishing lure and kit are set forth which includes a first member to be secured to the fishing line and a trailing, second member. A capture structure is provided on the first member for removably coupling a selected trailing member thereto. An elastic sleeve is shaped to constrict about the first member to maintain the coupling between the first and second members.

5 Claims, 5 Drawing Sheets

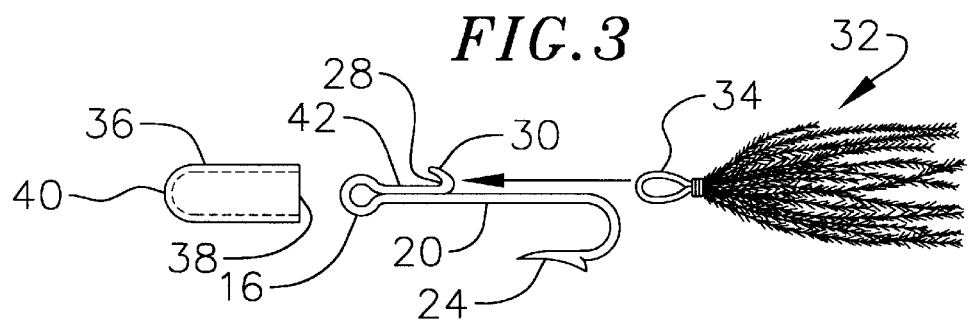
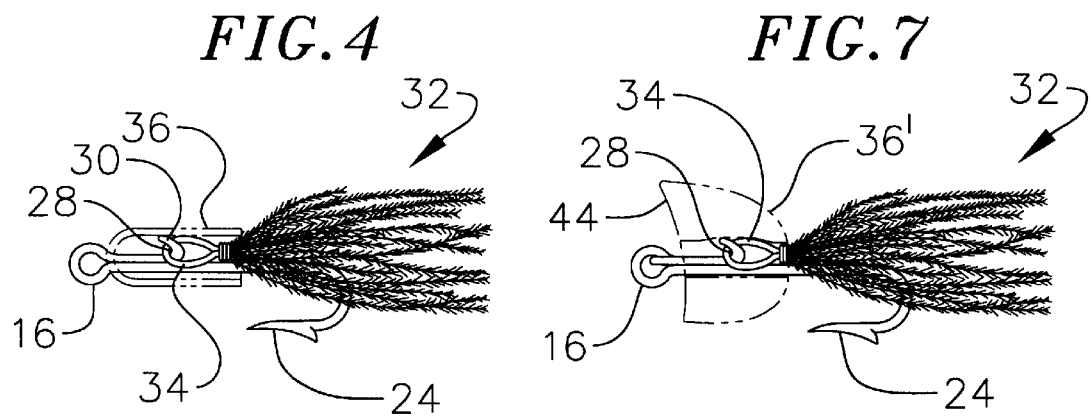
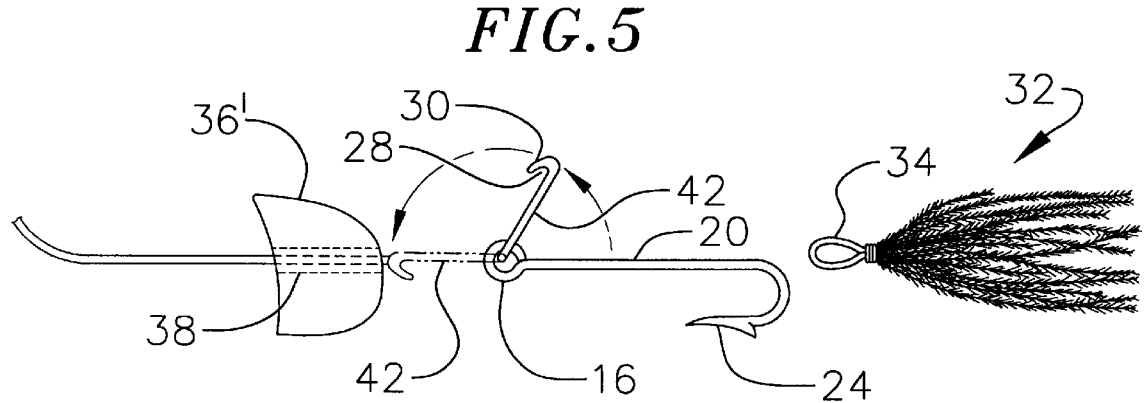
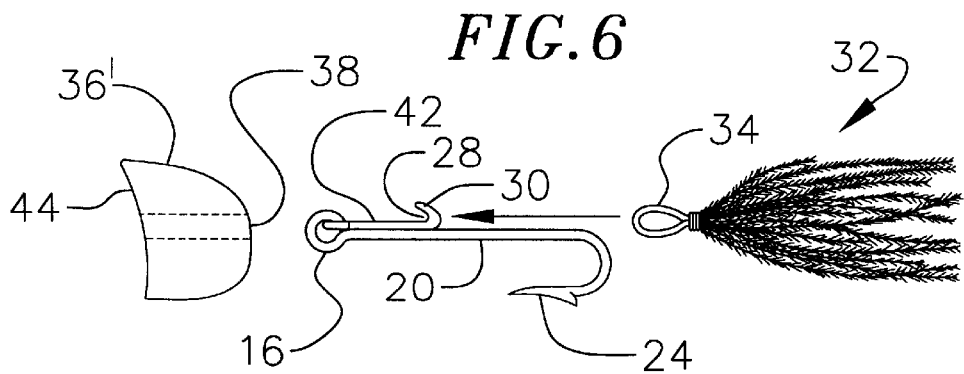

FISHING LURE AND KIT

FIELD OF THE INVENTION

The present invention relates to fishing lures and more particularly to fishing lures which can be quickly assembled and disassembled and to kits therefor to enable the fisherman to create a lure having a desired characteristic.

BACKGROUND

Fishing lures and kits therefor have been known as described in U.S. Pat. No. 5,630,289 issued May 20, 1997, to the application herein. Lures according to this patent include a head having an eye adapted for connection to a fishing line. The head includes a fish hook. A flexible, plastic body is secured over the hook to nest at the head such that the hook emerges from the side of the body. A barbed shaft, connected to a hackle or other component attractive to fish is inserted into the body to secure the hackle to the head-body construction to define the lure.

Repeated removal of the barbed shaft from the body to change the hackle can damage the body requiring replacement thereof. Further, the barbed shaft may be forcibly torn from the body on a snag or by a forceful strike by a fish resulting in loss of the hackle.

There is a need to provide an assembleable lure to more positively secure the hackle or other member to a head member to resist loss of the hackle. There is also a need to provide a kit of components which can be selected to assemble a lure having a desired characteristic be it color, shape or hydrodynamic performance.

SUMMARY OF THE INVENTION

There is, therefore, provided according to the present invention a fishing lure having a removable trailing member. A first member includes a forward end, means for connecting the first member to a fishing line, a hook and a forward opening notch. The trailing member for the lure has a loop adapted to be received in the notch to couple the trailing member to the first member. An elastic sleeve is adapted to be removably received over the first member to constrict at said notch to secure the selected trailing member to the first member and define the lure.

Also provided is a kit for fashioning a lure which has one or more first members each including a forward end and means for connecting the first member to a fishing line, a hook and a forward opening notch. One or more trailing members are provided each including a loop to be received in the notch to couple the trailing member to the first member. One or more elastic sleeves are provided, each adapted to be removably disposed to constrict at the notch to secure the trailing member to the first member and define the lure.

The trailing members for the kit may include hackles, worm-form members, minnow-form members or any other desired shape or configuration thought to be attractive to fish. Furthermore, the first members and/or trailing members may be of a variety of shapes and colors as well as providing different hydrodynamic performance in the water. Still further a plurality of elastic sleeves may be provided of different colors and shapes whereby the fisherman can assemble a lure of desired characteristics. As can be appreciated, by providing the loop-notch connection as well as the elastic sleeve, the connection between the hackle or other trailing component is positive in nature resisting loss of the trailing member or hackle on a snag, through repetitive use or upon a forceful strike by a fish.

BRIEF DESCRIPTION OF THE DRAWINGS

These and other features and advantages will become appreciated as the same becomes better understood with reference to the specification, claims and drawings wherein:

FIG. 3 is an exploded view of a lure according to a further embodiment of the present invention;

FIG. 4 is a partial section, assembled view of the lure of FIG. 3;

FIG. 5 is an exploded view of a lure according to yet another embodiment of the present invention;

FIG. 6 is a view of the lure of FIG. 5 shown in the position for coupling of a trailing member;

FIG. 7 is a partial section, assembled view of the lure of FIGS. 5 and 6;

DESCRIPTION

Figure 1:
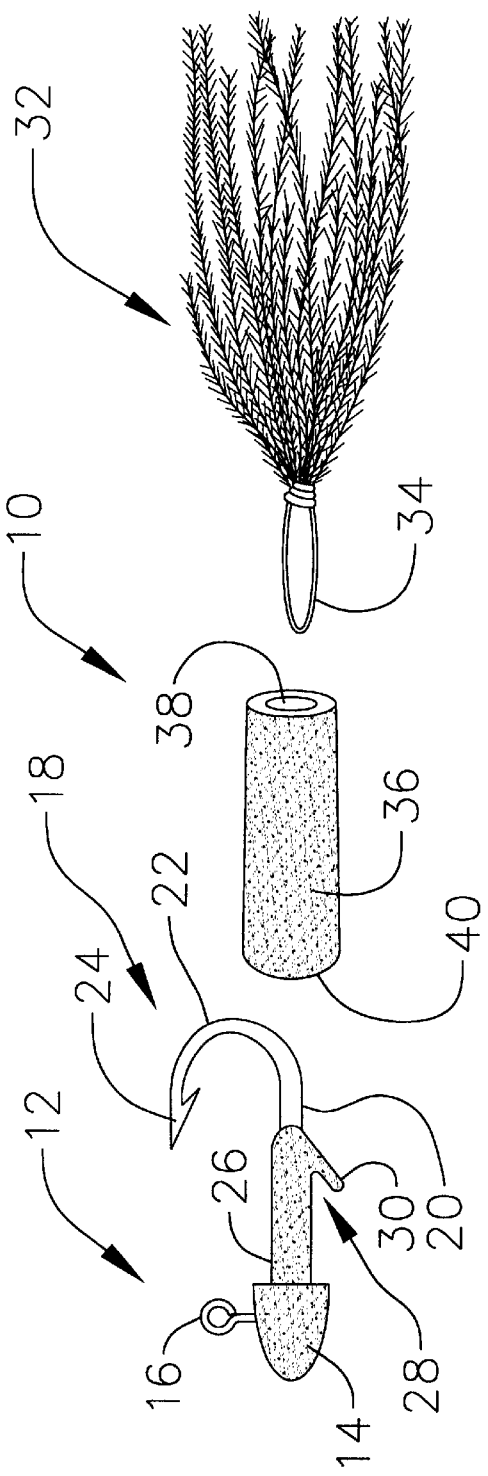
FIG. 1 is an exploded view of a lure according to one embodiment of the present invention.
Figure 2:
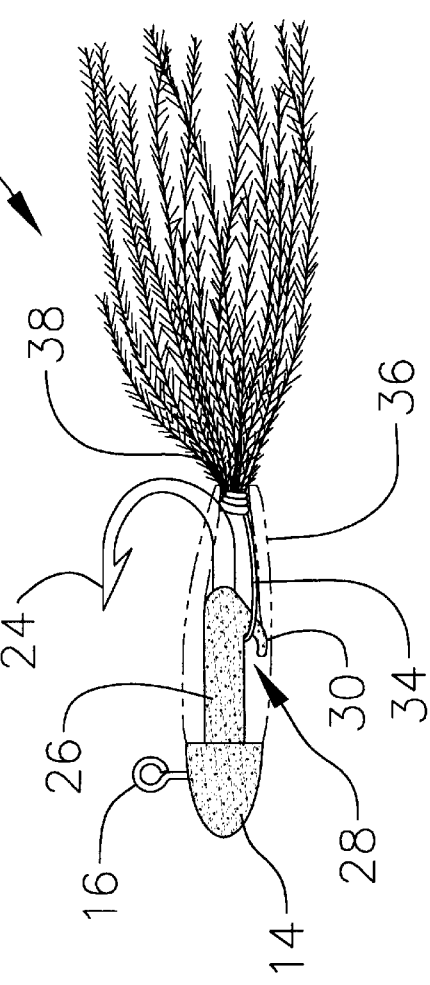
FIG. 2 is a partial section, assembled view of the lure of FIG. 1.

Turning to FIGS. 1 and 2 one embodiment of a lure 10 according to the present invention is shown. The lure 10 includes a first member 12 having at a forward end a head 14 for the lure 10. While the head 14 is shown as being a rounded, conical shape, it is understand that the head 14 could have any desired shape and could include a shape to impart hydrodynamic performance to the lure 10 such as by including a scoop, spoon or the like. At the head 14 are included means for securing the lure 10 to a fishing line which may be embodied as an eyelet 16. While the eyelet 16 is shown as being attached to one side of the head 14 it is to be understood that it could also be attached to the forward end of the head 14. Secured to and extending rearwardly from the head 14 is a hook 18 of known construction including a shaft 20 which transitions to the arcuate hook segment 22 including at its end a barb 24. The hook 18, as is known, is preferably fashioned from stainless steel or the like.

According to the embodiment shown in FIGS. 1 and 2, the first member 12 includes a body 26 extending along the hook shaft 20 from the head 14 approximately half way along the length of the shaft 20. The head 14 and a body 26 are preferably fashioned from lead, a rigid plastic material or other suitable material molded about the hook 18. If desired, the hook 18 may provide at its end opposite the barb 24 the eyelet 16 whereupon the first member 12 would be molded about the hook so as to expose the eyelet 16 for connection to the fishing line. As shown in the drawings, the body 26 is of a larger diameter than the shaft 20 for the hook 18 but a smaller diameter than the head 14.

Proximate the end of the body 26 there is provided a capturing structure defined according to this embodiment as a notch 28 which may be, as shown in FIGS. 1 and 2, fashioned by a finger 30 extending outwardly from the body 26 and angled forwardly toward the head 14. Preferably the finger 30 extends the radial distance from the hook shaft 20 comparable to the radius of the head 14. It is to be understood that the notch 28 could also be fashioned by enlarging the diameter of the body 26 and providing a forwardly directed, angular slit or by a wire stirrup molded into and extending from the body 26.

With continuing reference to FIGS. 1 and 2, the lure 10 also includes a trailing member 32 which may be a hackle, a worm-form or minnow-form or any other desired shape thought attractive to fish. The trailing member 32 includes a loop 34 which may be, as shown in the drawings, circular or oval in form but could also be in the shape of a hook or the like. Preferably a continuous loop-form is preferred for the loop 34 to prevent inadvertent release from the first member 12 when the lure 10 is assembled. The loop 34 may be wire or plastic and is configured to be received in the notch 28 as by passing it over the finger 30 to attach the trailing member 32 to the first member 12. Where the body 26 is formed to have a slit defining the notch 28, the loop 34 would be passed into the slit for connection of the trailing member 32 to the first member 12. Accordingly it is to be understood that the fisherman would select a first member 12 and desired trailing member 32 and connect the trailing member loop 34 to the notch 28 to make the connection there between.

To maintain engagement between the trailing member 32 and first member 12, lure 10 includes an elastic sleeve 36 fashioned from rubber, polymeric material or any other suitable elastic material. The sleeve 36 is cylindrical having an outside diameter comparable to that of the head 14 and an axial bore 38 comparable to the diameter of the body 26. Preferably the diameter of the bore 38 is slightly less than the diameter of the body 26 so that the sleeve 36, as hereinafter described, would elastically constrict against the body 26. At one end the sleeve 36 may include an integrally fashioned cap 40 which may be spherical in shape. The axial length of the sleeve 36 is preferably comparable to the distance from the head 14 to the most distal location of the hook segment 22 as shown in FIG. 2. While the exterior of the sleeve 36 may be smooth, it is to be understood that it could also be provided with circumferential ridges to impart an appearance similar to that of a worm, larvae or other configuration. Furthermore, the sleeve 36 need not have a cylindrical exterior wall but could be rounded as in the shape of a barrel or the like as shown in FIG. 2. Still further the sleeve may be embodied as an elastic band having a suitable axial dimension to envelop the notch 28. To enhance the attraction of the lure 10, the sleeve may be impregnated with a fish attractant or suitable to be impregnated with attractant.

To assemble the lure 10, the sleeve 36 is passed over the hook 18 with the barb 24 piercing the cap 40. The sleeve 36 is positioned with the hook 18 passing from the bore 38 or piercing the side of the sleeve 36 as shown in FIG. 2. Thereafter the loop 34 of a selective trailing member 32 is inserted through the bore 38 and is received in the notch. In this position the elastic nature of the sleeve 36 constricts about the body 26 to cover and envelop the notch 28 to retain the engagement between the loop 34 and notch 28. As can be appreciated the forwardly directed orientation of the notch 28 resists release of the trailing member 32 from the first member 12 should the trailing member 32 be pulled in a rearward direction which typically is the direction of forces which would be imposed upon the trailing member 32. The constriction of the sleeve 36 about the body 26 otherwise retains the engagement between the loop 34 and notch 28. As shown in FIG. 2, the length of the loop 34 may be such that the hackle of the trailing member 32 may be partially received in the bore 38 further securing the trailing member 32 thereto. Thereafter the lure 10 may be connected to the fishing line and used or the lure configuration changed while attached to the fishing line.

Where the sleeve 36 is embodied as an elastic band, the sleeve 36 is passed over the hook 18 to a position forward of the notch 28. The trailing member loop 34 is positioned in the notch 28 and the sleeve 36 is moved or rolled to constrict over and envelop the notch 28 and prevent disengagement of the loop 34.

Should a fisherman believe that a different configuration of the lure 10 is required, he may change trailing members 32 by simply urging the trailing member 32 forwardly and twisting to disengage the loop 34 from the notch 28 and pulling it from the bore 38 of the sleeve 36. A new trailing member 32 is thereafter connected to the first member 12 in the manner described above.

Turning to FIGS. 3 and 4, a further embodiment of the lure 10 according to the present invention is shown. According to this embodiment, the first member 12' is embodied as a hook 18 having at one end the eyelet 16 formed by bending a leg 42 180 degrees about the axis of the shaft 20. Alternatively the leg 42 can be secured to the hook shaft 20 by soldering, welding, brazing, adhesive bonding or by a clip. The leg 42 at its end and located proximate the midpoint of the shaft 20, includes the finger 30 defining the capture structure representing the notch 28. To assemble the lure 10 according to this embodiment, the sleeve 36 is passed over the barb 24, with the barb 24 passing through the bore 38, the sleeve 36 passed along the length of the shaft 20 over the leg 42 to nest the cap 40 against the rearward most extremity of the eyelet 16. Thereafter the loop 34 of the trailing member 32 is inserted through the bore 38 and connected to the notch 28 in the manner described above. As shown in FIG. 4, the length of the sleeve 36 may be such as to envelop a portion of the trailing member 32 within the bore 38 whereby the sleeve 36 constricts about the hackle as shown.

With reference to FIGS. 5–7 yet another embodiment of the lure 10 according to the present invention is shown. According to this embodiment, the sleeve 36' is embodied as having a hydrofoil front face 44 adapted to impart certain hydrodynamic characteristics to the lure 10. According to the embodiment shown in FIGS. 5–7, the front face 44 is configured to provide a surface popping characteristic to the lure 10 comparable to that of popping type plugs and lures.

To provide the capture structure, a leg 42 of separate construction is linked to the eyelet 16. As shown in FIG. 5, the leg 42 can swivel about the eyelet 16. The leg 42 includes at its end the finger 30 defining the notch 28. According to this construction, the hook 18 can be of conventional construction with the separate leg 42 linked to the eyelet 16. Further, the sleeve 36' according to this embodiment may include that the bore 38 extend therethrough.

To assemble the lure 10 of FIGS. 5–7, the leg 42 is attached to the eyelet 16. The end of the leg 42 coupled through the eyelet 16 may have a hook or a loop construction to be easily received through the eyelet 16. The leg 42 is thereafter positioned against the shaft 20 of the hook 18 and the loop 34 of the selecting trailing member 32 and the notch 28. Thereafter the sleeve 36 is passed over the eyelet 16 and leg 42 to constrict there against, as shown in FIG. 7, to retain the connection between the loop 34 and notch 28. The eyelet 16 may then be used to connect the assembled lure 10 to the fishing line.

Where the hook 18 is already attached to a fishing line, the fisherman passes the sleeve 36' over the hook, with the hook 18 passing through the bore 38, and the sleeve 36' is moved to a position along the fishing line as shown in FIG. 5. Thereafter the leg 42 is connected to the eyelet 16 in the manner described above, is swivelled to a position against the shaft 20 to receive the loop 34 of the trailing member 32. When the loop 34 is positioned in the notch 28, the sleeve 36' is moved down the fishing line, over the eyelet 16 to envelop and constrict against the leg 42 to retain the loop 34 within the notch 28.

Figure 8:
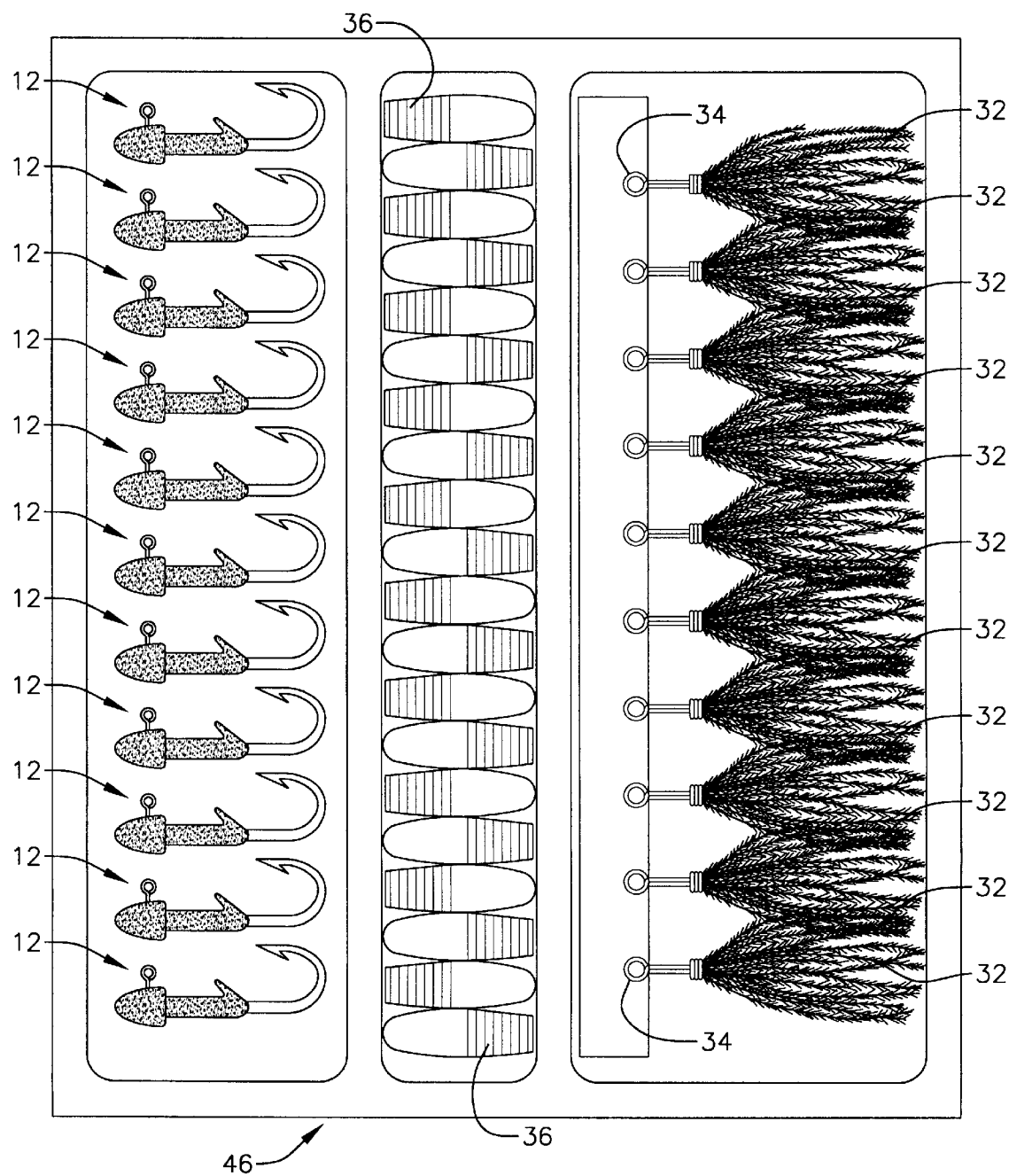
FIG. 8 illustrates a kit for fashioning a lure of desired characteristics.

Turning to FIG. 8 there is shown one embodiment of a kit 46 by which a fisherman may assemble a lure 10 of desired characteristics. The kit 46 includes a plurality of first members 12 each of which, or at least a plurality of which, include different characteristics which may include color, shape, design or hydrodynamic performance inducing configurations. The kit 46 shown in FIG. 8 illustrates a plurality of first members 12 each of which would have different colors while being of identical shape. The kit 46 also includes a plurality of sleeves 36 each of which, or a plurality of which, include different characteristics. The kit 46 shown in FIG. 8 illustrates that the sleeves 36 may be of different colors while of the same construction; however, it is to be understood that the sleeves 36 could be configured to have different shapes or hydrodynamic performance inducing configurations such as, for example, illustrated by the sleeve 36' of FIGS. 5–7. The kit 46 also includes a plurality of trailing members 32 shown as hackles. While the kit 46 of FIG. 8 illustrates that the trailing members 32 are of similar hackle design of different colors, it is to be understood that the trailing members 32 could be of different forms, colors, designs and characteristics, each including the loop 34 for connection to the notch 28 of the first member 12.

Accordingly, a fisherman provided with the kit 46 of FIG. 8, could select the desired first member 12, trailing member 32 and sleeve 36 to assemble a lure 10 having the desired characteristics of shape, size, color or desired hydrodynamic performance.

Figure 9:
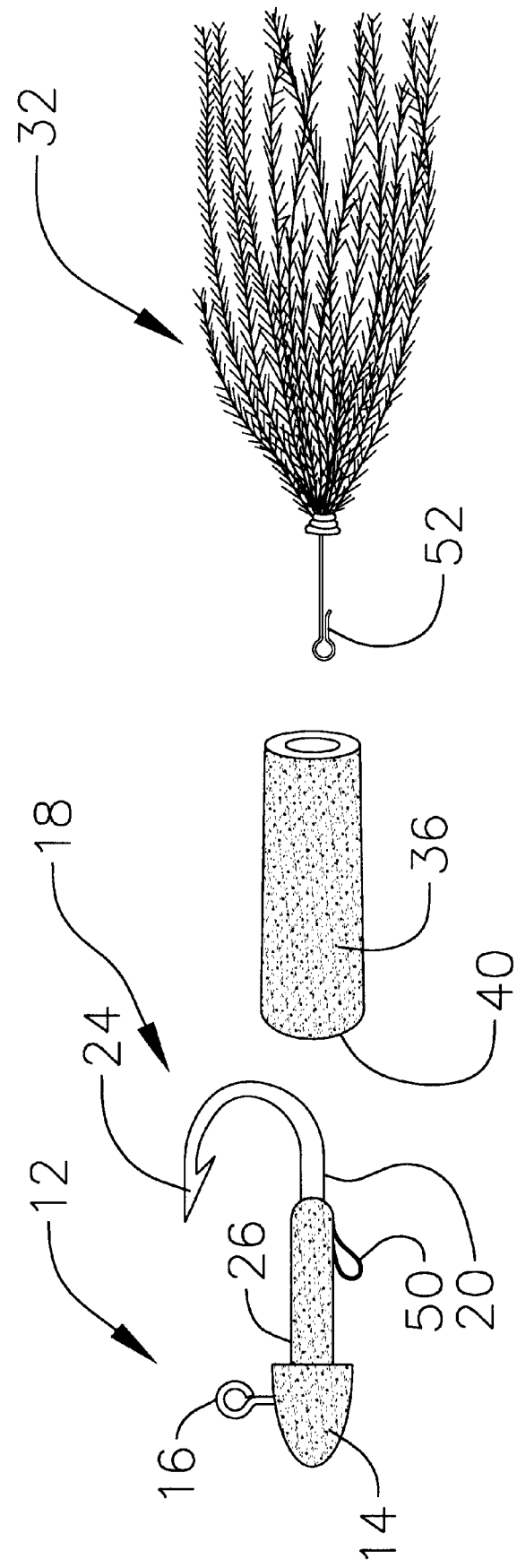
FIG. 9 illustrates a further embodiment of a lure according to the present embodiment.

Turning to FIG. 9 yet another embodiment of the lure 10 is shown. This embodiment is like the embodiment of FIGS. 1 and 2 except that the capture structure rather than being embodied as a notch 28 is fashioned by a wire stirrup 50 molded into the body 26. The trailing member 32, instead of including the loop 34 has a clip 52 adapted to be received over the stirrup 50 to secure the trailing member to the body 26. After the sleeve 36 has been disposed about the body 26 with the hook 22 emerging from the bore 38 or side of the sleeve 36, the trailing member clip 52 is inserted to grasp the stirrup 50 to secure the trailing member 52 to the body 26.

Figure 10:
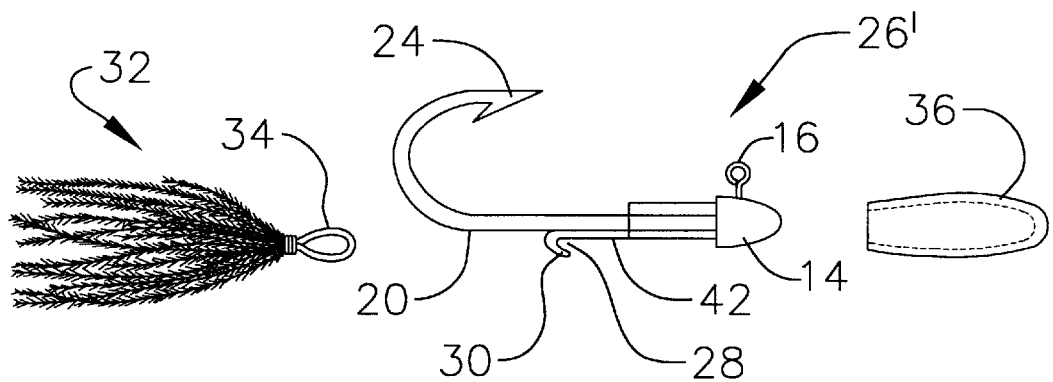
FIG. 10 illustrates yet another embodiment of the present invention.

Turning to FIG. 10 still a further embodiment of the present invention os shown. According to this embodiment, the body 26' is tubular to closely pass the shaft 20 of the hook 18 and is fashioned to include the head 14, leg 42 with the finger 30 defining the notch 28. The body 26' may be, for example, a deformable material such as lead crimped about the hook 18 to attach the body 26' thereto. Alternatively the body 26' could be rigid and secured as by soldering, welding or the like. The head 14 has the eyelet 16. As can be appreciated, the eyelet 16 could also be the eyelet 16 of a standard hook 18 having the body 26' secured thereto. The trailing member 32 has the loop 34 for attaching the trailing member 32 to the body 26' in the manner described above. Also included is the elastic sleeve 36 for completing the lure 10.

Figure 11:
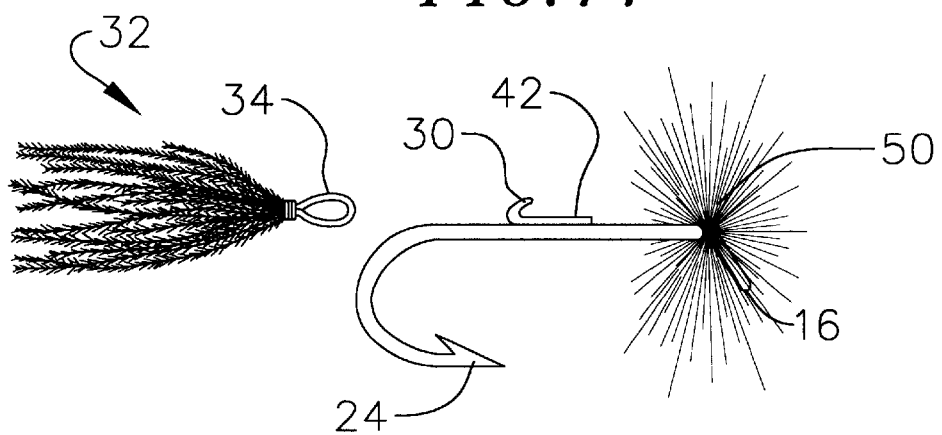
FIG. 11 illustrates yet another embodiment of the present invention.
Figure 12:
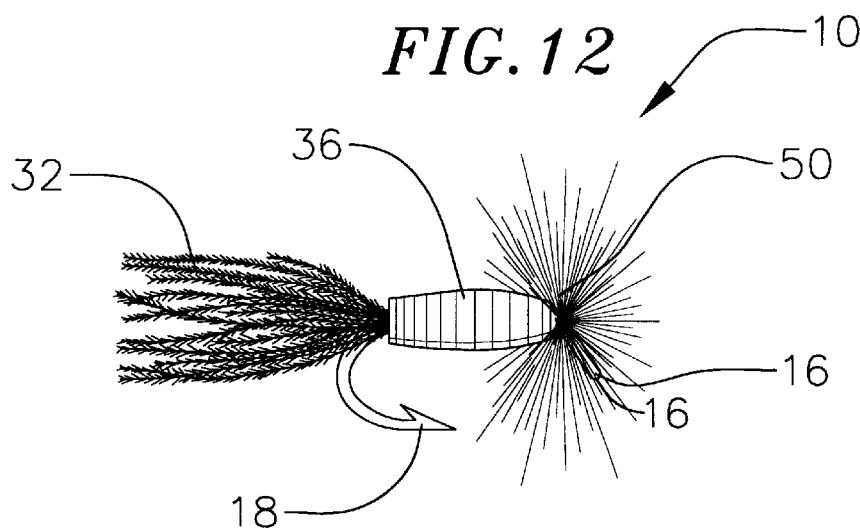
FIG. 12 shows the assembled lure of FIG. 11.

Turning to FIGS. 11 and 12 still a further embodiment is shown. This embodiment is like that of FIGS. 3 and 4 except that the leg 42 is connected to the shaft 20 of a standard hook 18 including the eyelet 16 as by bonding, soldering or welding. The lure 10 also includes a hackle 50 disposed forwardly of the leg 42 proximate the eyelet 16. The lure 10 is assembled in the manner described by positioning the sleeve 36 over the hook shaft 20 to confine the loop 34 engaged in the notch 28.

While I have described certain embodiments of the present invention, it is understood that it is subject to many modifications and changes without departing from the spirit and scope of the appended claims.

I claim:

1. A fishing lure including a removable trailing member comprising:

a member having a head and a body including capturing structure;

a hook, said body extending along a portion of the hook;

the trailing member including a loop to be positioned at the side of said body and to releasably engage said capturing structure, the loop encircling the capture structure when installed thereon; and an elastic sleeve removably disposed over said body to constrict over the capture structure to maintain said loop engaged with said capturing structure, said sleeve deformable to a position to free the trailing member loop from the capture structure for release of the trailing member from the first member for removal thereof.

2. A fishing lure including a removable trailing member comprising:

a member including at a forward end means for connecting the member to a fishing line, a hook and a capture structure;

the trailing member including a loop to engaged with the capture structure to releasably retain the trailing member to the member proximate the hook, the loop encircling the capture structure when installed thereon; and a pliable sleeve disposed to constrict over the engagement between the trailing member loop and the member to retain the loop engaged with the capture structure to connect said trailing member to said member, said sleeve deformable to a position to free the trailing member loop from the capture structure for release of the trailing member from the member for removal thereof.

3. The lure of claim 1 wherein said member includes a body disposed along said hook and at the forward end an enlarged head, said body including a forwardly directed finger defining said capture structure as a notch, said loop adapted to be received in said notch.

4. A fishing lure having a replaceable trailing member comprising:

a head and a rearwardly projecting body, said body including a notch structure disposed along the length of the body;

a hook having a shaft and an arcuate segment having at one end a barb, said body extending along a portion of the shaft;

the trailing member having a loop to extend at the side of the shaft to be received into said notch to locate the member in a trailing position and releasably connect the trailing member to the body, the loop encircling the notch structure when installed thereon; and an elastic sleeve disposed over said body to retain said loop in the notch structure, said sleeve elastically deformable to uncover said notch structure for release of said loop for removal and replacement of said trailing member.

5. The lure of claim 4 including a forwardly projecting finger on the body defining said notch.

* * * * *